(12) United States Patent
Kobayashi et al.

(10) Patent No.: US 6,811,182 B2
(45) Date of Patent: Nov. 2, 2004

(54) VEHICLE OCCUPANT RESTRAINT SYSTEM AND METHOD

(75) Inventors: Masaaki Kobayashi, Yokohama (JP); Hiroyuki Miyasaka, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 3 days.

(21) Appl. No.: 10/155,123

(22) Filed: May 28, 2002

(65) Prior Publication Data

US 2002/0175507 A1 Nov. 28, 2002

(30) Foreign Application Priority Data

May 28, 2001 (JP) ........................................ 2001-159327

(51) Int. Cl.[7] .............................................. B60R 21/32
(52) U.S. Cl. ..................................................... 280/735
(58) Field of Search ............................ 280/735, 728.1; 701/45–47

(56) References Cited

U.S. PATENT DOCUMENTS

| | | | | |
|---|---|---|---|---|
| 4,243,248 A | | 1/1981 | Scholz et al. ............... | 280/735 |
| 5,071,160 A | * | 12/1991 | White et al. ................ | 280/735 |
| 5,202,831 A | * | 4/1993 | Blackburn et al. ............ | 701/46 |
| 5,398,185 A | * | 3/1995 | Omura ........................ | 701/45 |
| 5,400,487 A | * | 3/1995 | Gioutsos et al. ............ | 280/735 |
| 5,490,069 A | * | 2/1996 | Gioutsos et al. ............... | 701/45 |
| 5,746,444 A | * | 5/1998 | Foo et al. .................... | 280/735 |
| 5,758,899 A | * | 6/1998 | Foo et al. ................. | 280/730.2 |
| 5,785,347 A | * | 7/1998 | Adolph et al. .............. | 280/735 |
| 5,863,067 A | | 1/1999 | Blumenthal et al. ........ | 280/741 |
| 5,986,221 A | * | 11/1999 | Stanley ........................ | 177/136 |
| 6,036,225 A | * | 3/2000 | Foo et al. .................... | 280/735 |
| 6,186,539 B1 | * | 2/2001 | Foo et al. .................... | 280/735 |
| 6,460,882 B1 | | 10/2002 | Andres ........................ | 280/735 |

FOREIGN PATENT DOCUMENTS

| | | |
|---|---|---|
| DE | 42 22 595 A1 | 1/1993 |
| JP | 5-39000 | 2/1993 |

* cited by examiner

*Primary Examiner*—Charles T. Jordan
*Assistant Examiner*—Bret Hayes
(74) *Attorney, Agent, or Firm*—McDermott Will & Emery LLP

(57) ABSTRACT

A vehicle occupant restraint system includes a first restraint apparatus to restrain an occupant in a first direction such as the longitudinal direction of the vehicle, and a second restraint apparatus to restrain the occupant in a second direction such as the lateral direction. A control unit triggers the first restraint apparatus upon a collision tending to throw the occupant in the first direction. Thereafter, the control unit sets a delay time in accordance with a condition representing the amount of movement of the occupant in the second direction, and triggers the second restraint apparatus at a timing delayed by the delay time with respect to the first trigger action of triggering the first restraint apparatus.

25 Claims, 11 Drawing Sheets

| Gx \ Gy | 10G | 20G | 30G |
|---|---|---|---|
| 10G | 2 | 0 | 0 |
| 20G | 3 | 2 | 0 |
| 30G | 5 | 3 | 2 |

UNIT : msec

| Gx \ Gy | 10G | 20G | 30G |
|---|---|---|---|
| 10G | 2 | 3 | 5 |
| 20G | 0 | 2 | 3 |
| 30G | 0 | 0 | 2 |

UNIT : msec

ND METHOD

BACKGROUND OF THE INVENTION

The present invention relates to technique for vehicle occupant restraint, and more specifically to control of vehicle occupant restraint in the longitudinal (front and rear) direction of the vehicle and vehicle occupant restraint in the lateral (left and right) direction.

Seat belts, air bags and knee bolsters are designed to restrain a vehicle occupant (driver or passenger) in the case of vehicle collision. In general, a seat belt system is worn in an asymmetric manner with respect to the median plane of the occupant's body, so that the body of the occupant tends to move in a torsional manner. A published Japanese Patent Application, Publication (KOKAI) No. H05(1993)-39000 discloses a vehicle occupant restraint system designed to reduce the torsional movement of an occupant and maximize the impact absorbing effect. This system measures the physical constitution (build) and behavior of a passenger with a passenger measuring sensor, and adjusts air bag, seat belt and knee bolster.

SUMMARY OF THE INVENTION

It is an object of the present invention to provide vehicle occupant restraint system and/or method capable of restraining the movement of an occupant more reliably. Another object is to provide vehicle occupant restraint system and/or method for triggering a first restraint system for restraining an occupant in a first direction and a second restraint system for restraining the occupant in a second direction at proper timings upon collision.

According to one aspect of the present invention, a vehicle occupant restraint system comprises: a first restraint apparatus to restrain an occupant in a vehicle in a first direction of the vehicle; a second restraint apparatus to restrain the occupant in a second direction of the vehicle, the first direction being one of a longitudinal direction and a lateral direction of the vehicle, the second direction being the other of the longitudinal direction and lateral direction of the vehicle; a sensing section to sense a first operating condition to detect a collision of the vehicle tending to push the occupant in the first direction, and a second operating condition indicative of movement of the occupant resulting from the collision; and a controller configured to trigger the first restraint apparatus on the occurrence of the collision tending to push the occupant in the first direction, to set a delay time in accordance with the second condition, and to trigger the second restraint apparatus at an instant delayed by the delay time with respect to a first trigger action of triggering the first restraint apparatus.

According to another aspect of the present invention, a vehicle occupant restraining method for restraining a vehicle occupant in a vehicle, comprises: sensing a first operating condition to detect a collision of the vehicle tending to push the occupant in a first direction which is one of longitudinal direction and lateral direction of the vehicle; performing a first trigger action to restrain the vehicle occupant in the first direction; sensing a second operating condition indicative of movement of the occupant resulting from the collision; setting a delay time in accordance with the second condition; and restraining the occupant in a second direction which is the other of the longitudinal direction and lateral direction, at an instant delayed by the delay time with respect to the first trigger action.

The other objects and features of this invention will become understood from the following description with reference to the accompanying drawings.

DETAILED DESCRIPTION OF THE INVENTION

Figure 2:
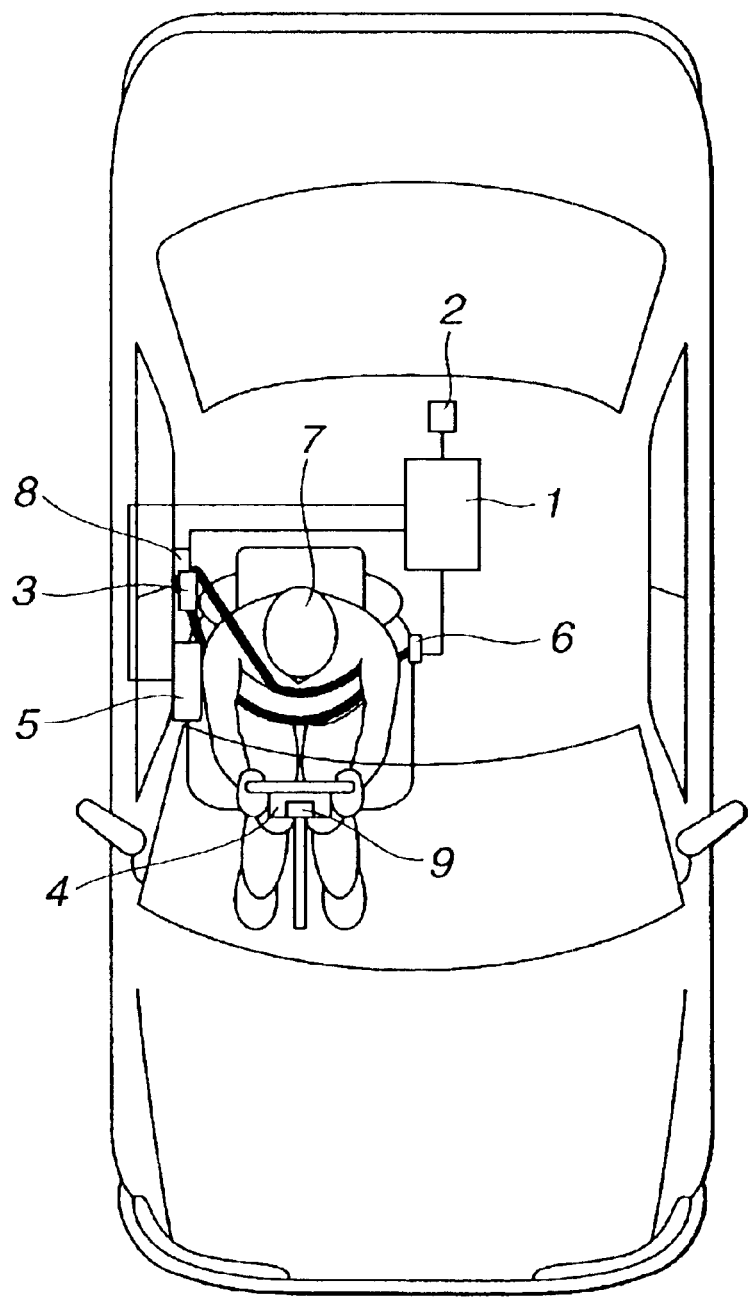
FIG. 2 is a schematic plan view showing a vehicle equipped with the vehicle occupant restraint system according to the first embodiment.

FIG. 2 is a plan view showing a vehicle equipped with a vehicle occupant restraint system according to a first embodiment of the present invention. A control unit 1 shown in FIG. 2 is a controller section or controller for controlling a vehicle occupant restraint actuator section in accordance with information collected by a sensor section 2 for detecting a collision of the vehicle.

Figure 1:
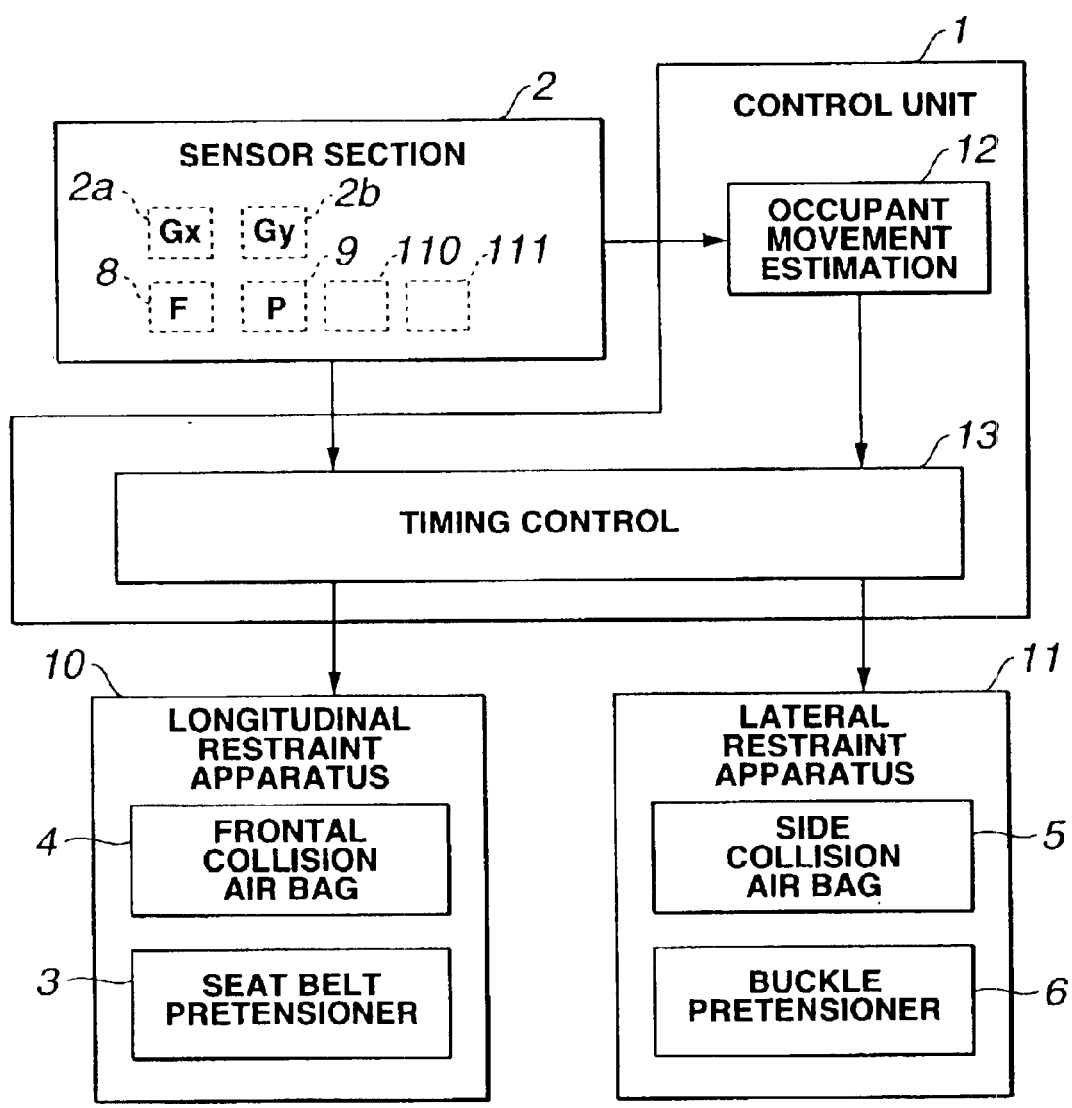
FIG. 1 is a block diagram showing a structure of a vehicle occupant restraint system according to a first embodiment of the present invention.

In this example, the sensor section 2 is an acceleration sensing unit which includes a longitudinal acceleration sensor 2a (as shown in FIG. 1) for sensing a longitudinal acceleration (Gx) of the vehicle, and a lateral acceleration sensor 2b (as shown in FIG. 1) for sensing a lateral acceleration (Gy) of the vehicle. It is optional to employ at least one of a sensor, installed at a front end of a front side member of the vehicle body, for sensing a frontal collision of the vehicle, and a sensor, installed at a lower end of a center pillar or each of left and right center pillars, for sensing a side collision of the vehicle.

A seat belt pretensioner 3 is an occupant restraint device for restraining a vehicle occupant 7 (who is a driver in the example of FIG. 2) by withdrawing a seat belt so as to take up slack in the seat belt at an early stage of a collision. Seat belt pretensioner 3 of this example further has function of load limiter. A frontal collision air bag (or front air bag) 4 is an air bag for frontal collision. Frontal collision air bag 4 absorbs impact energy caused by interference between occupant 7 and a vehicle component such as a steering wheel in the case of frontal collision. In this example, seat belt pretensioner 3 and first air bag 4 are components of a restraining apparatus for restraining occupant 7 in the longitudinal direction of the vehicle.

A side air bag (or side collision air bag) 5 is for side collision. Side collision air bag 5 is arranged to absorb impact energy and prevent direct contact between occupant 7 and a vehicle structural member such as a pillar in the case of side collision. A buckle pretensioner 6 is a device for withdrawing a buckle of the seat belt in a rearward direction toward the rear of the vehicle. In this example, air bag 5 and buckle pretensioner 6 are components of a restraint apparatus for restraining occupant 7 in the lateral direction. These actuating devices 3, 4, 5 and 6 of the restraint system are triggered at timings controlled by control unit 1.

FIG. 1 is a block diagram showing the structure of the vehicle occupant restraint system according to the first embodiment. This system is a control system including a controller section (1), a sensor section (2) and an actuator section (10, 11). In this embodiment, the control section is composed of control unit 1, and the sensor section is composed of accelerator sensor unit 2 for sensing collision. The actuator section includes a longitudinal restraint apparatus 10 for restraining the vehicle occupant in the longitudinal direction and a lateral restraint apparatus 11 for restraining the vehicle occupant in the lateral direction. Acceleration sensor unit 2 of this example includes longitudinal acceleration sensor 2a for sensing a longitudinal acceleration of the vehicle body, and lateral acceleration sensor 2b for sensing a lateral acceleration of the vehicle body. Control unit (serving as a main component of controller) 1 includes a subsection 12 for estimating, examining or predicting movement of vehicle occupant 7, and a subsection 13 for controlling timings of triggering longitudinal and lateral restraint apparatus 10 and 11. In the case of frontal collision, control unit 1 triggers longitudinal restraint apparatus 10 (first restraint apparatus) first, and then triggers lateral restraint apparatus 11 (second restraint apparatus) at the end of a delay time (Td1) determined in accordance with the amount of movement of the occupant. In the case of side collision, control unit 1 triggers lateral restraint apparatus 11 (first restraint apparatus) first, and then triggers longitudinal restraint apparatus 10 (second restraint apparatus) at the end of a delay time (Td2) determined in accordance with the amount of movement of the occupant.

The functions of subsections 12 and 13 are both carried out by control unit 1. In this example, longitudinal restraint apparatus 10 includes air bag 4 for frontal collision and seat belt pretensioner 3, and lateral restraint apparatus 11 includes air bag 5 for side collision and buckle pretensioner 6.

Figure 3:
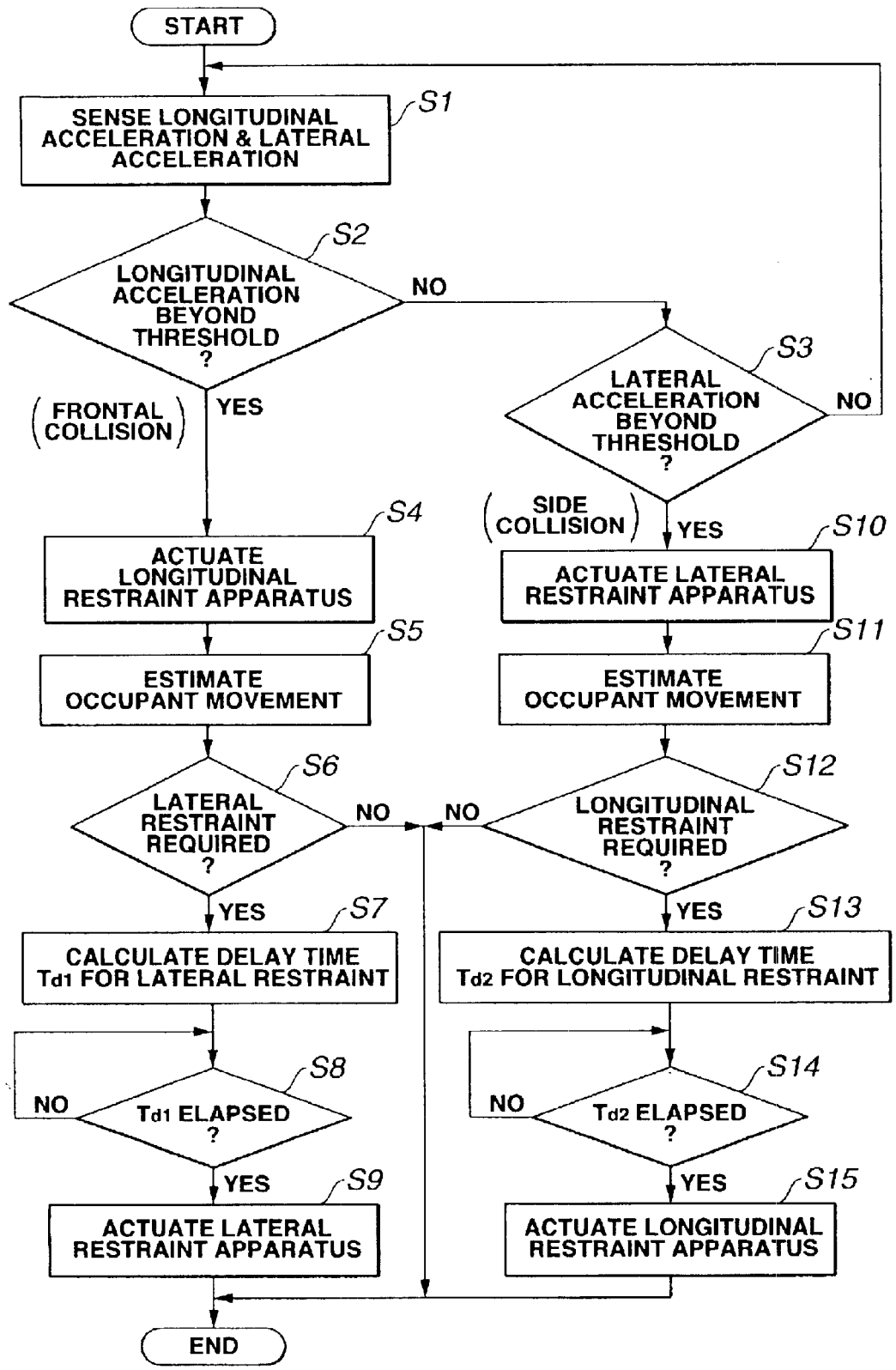
FIG. 3 is a flowchart showing a control process according to the first embodiment.
Figure 4A:
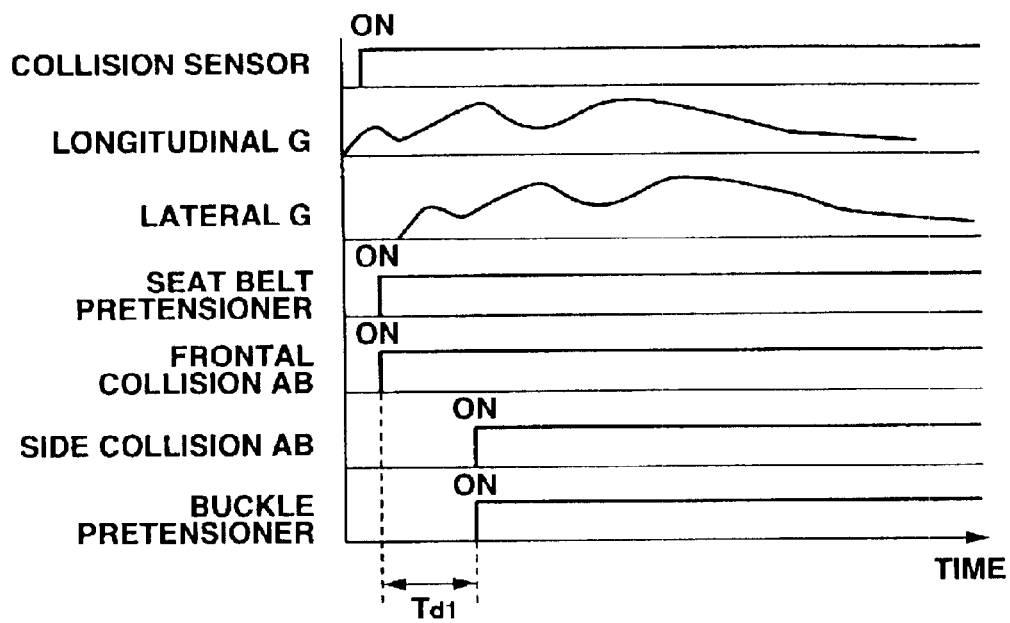
FIGS. 4A and 4B are time charts for illustrating operations of the restraint system of FIG. 2 in frontal collision and side collision, respectively.
Figure 4B:
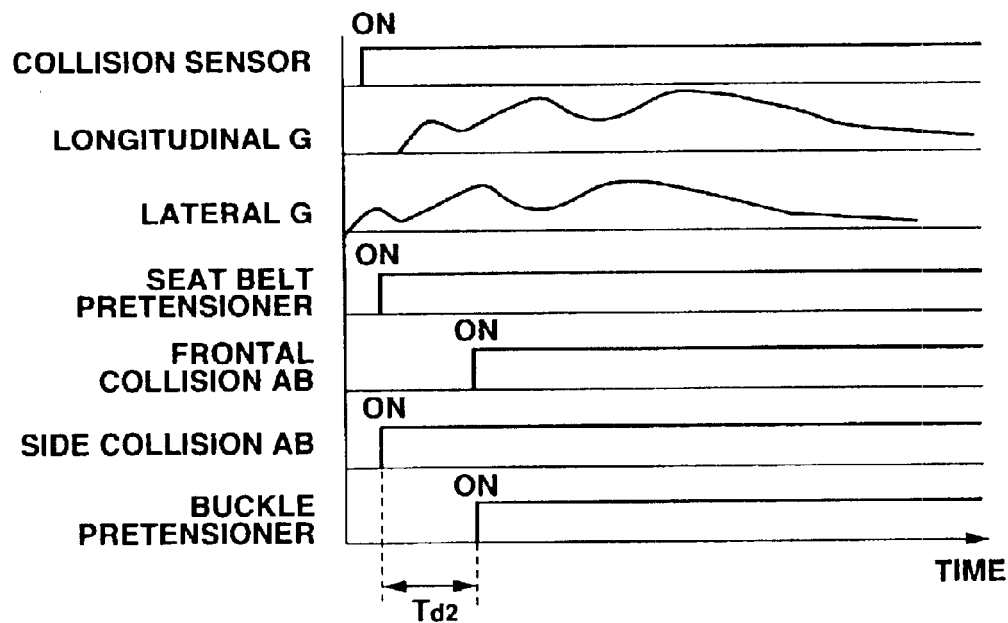
Figure 6:
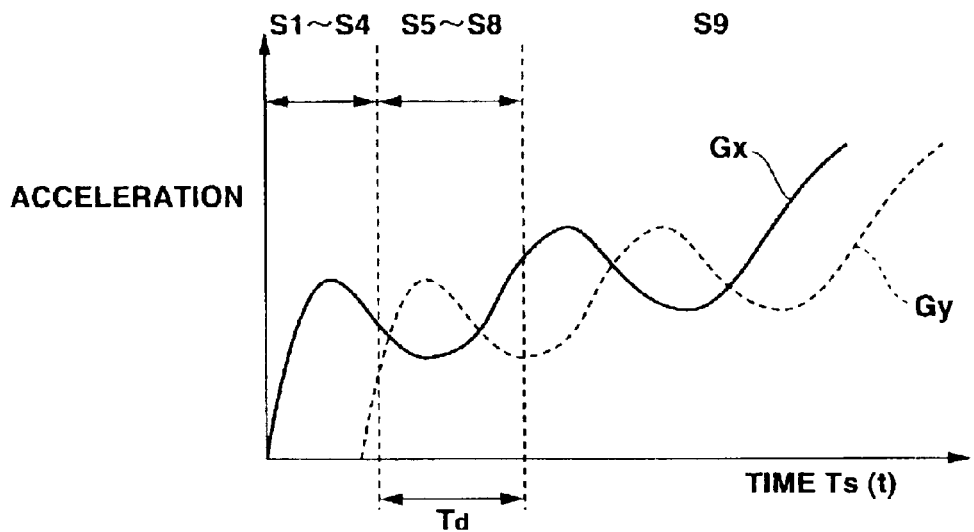
FIG. 6 is a graph showing variation of vehicle body acceleration in the case of an oblique frontal collision during the process of steps shown in FIG. 3.

FIG. 3 is a flowchart showing a control procedure performed by control unit 1 of the vehicle occupant restraint system. FIGS. 4A and 4B are time charts in the restraint system according to the first embodiment, in the case of frontal collision and side collision, respectively. FIG. 6 shows time variation in longitudinal acceleration Gx and lateral acceleration Gy in the process of steps S1~S9 of FIG. 3 in the case of a frontal collision receiving impact obliquely.

At step S1 of FIG. 3, control unit 1 reads the longitudinal acceleration and lateral acceleration of the vehicle, sensed by acceleration sensor unit 2. Then, at step S2, control unit 1 compares vehicle longitudinal acceleration with a predetermined threshold. If the sensed vehicle longitudinal acceleration is higher than the predetermined threshold, control unit 1 judges that a frontal collision has occurred, and proceeds to step S4. If the sensed longitudinal acceleration is not higher than the predetermined threshold, then control unit 1 proceeds from step S2 to step S3, and compares the sensed vehicle lateral acceleration with a predetermined threshold to examine the occurrence or nonoccurrence of a side collision (or lateral collision). If the sensed lateral acceleration is higher than the predetermined threshold of the lateral acceleration, control unit 1 judges that a side collision has occurred, and proceeds to step S10. If the sensed lateral acceleration is not higher than the predetermined threshold, then control unit 1 returns from step S3 to step S1 on the assumption that there is no collision.

In the case of frontal collision, control unit 1 actuate air bag 4 for frontal collision and seat belt pretensioner 3 of longitudinal (first) restraint apparatus 10, at step S4. Longitudinal restraint apparatus 10 acts to restrain the forward movement of the vehicle occupant.

Then, control unit 1 performs operations to estimate the amount of movement of the occupant in the longitudinal direction and the amount of movement of the occupant in the lateral direction at step S5 following step S4, and determines, at step S6, whether to further actuate the lateral (second) restraint apparatus 11, by using the estimated amount of the longitudinal movement and the estimated amount of the lateral movement. If the decision is that there is no need to actuate lateral restraint apparatus 11, then control unit 1 terminates the procedure. If the decision is that there is a need for actuating lateral restraint apparatus 11, then control unit 2 calculates a delay time Td1 for the actuation (or trigger action) of lateral (second) restraint apparatus 11. Then, control unit 1 waits at step 58 until the expiration of the delay time Td1 determined at step S7, and actuates the side collision air bag 5 and buckle pretensioner 6 of lateral restraint apparatus 11 at the expiration of the delay time Td1, at step S9.

In the case of side collision, control unit 1 actuate side air bag 5 for side collision and buckle pretensioner 6 of lateral (first) restraint apparatus 11, at step S10. Then, control unit 1 performs operations to estimate the amount of movement of the occupant in the longitudinal direction and the amount of movement of the occupant in the lateral direction at step S11, and determines, at step S12, whether to further actuate longitudinal (second) restraint apparatus 10, by using the estimated amount of the longitudinal movement and the estimated amount of the lateral movement. If the decision is that there is no need to actuate longitudinal restraint apparatus 10, then control unit 1 terminates the procedure. If the decision is that there is a need for actuating longitudinal restraint apparatus 10, then control unit 1 calculates a delay time Td2 for the actuation of longitudinal (second) restraint apparatus 10. Then, control unit 1 waits at step S14 until the expiration of the delay time Td2 determined at step S13, and actuates the front air bag 4 and seat belt pretensioner 3 of longitudinal restraint apparatus 10 at the expiration of the delay time Td1, at step S15.

Figure 5:
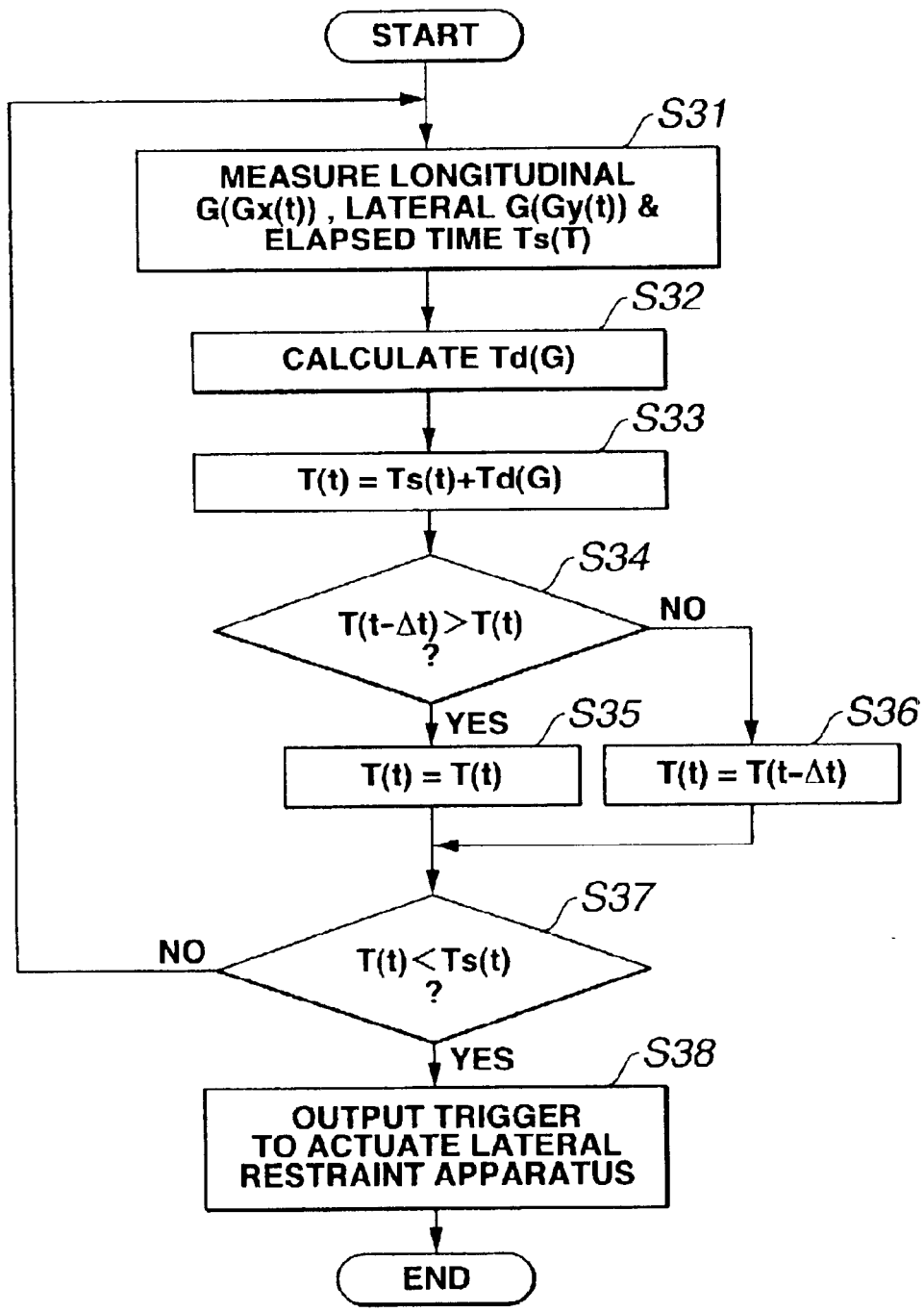
FIG. 5 is a flowchart showing a process according to the first embodiment, for determining a delay time from the actuation of a first restraint apparatus to the actuation of a second restraint apparatus.

FIG. 5 shows in detail the process after the actuation of the first restraint apparatus (10) from step S6 to step S9.

At step S31 after the actuation of the first restraint apparatus which is longitudinal restraint apparatus 10 in the case of frontal collision, control unit 1 measures the longitudinal acceleration Gx of the vehicle body, the lateral (left and right) acceleration Gy of the vehicle body, and an elapsed time Ts(t) after the collision or the actuation of the first (longitudinal) restraint apparatus (10). At next step S32, control unit 1 calculates a delay time Td (Td1 or Td2) for the actuation of the second restraint apparatus (11), in accordance with a first parameter which represents the amount of movement of the occupant in the first direction (which is the longitudinal direction in the case of frontal collision) and which is determined from the longitudinal acceleration Gx in the case of frontal collision, and a second parameter which represents the amount of movement of the occupant in the second direction (which is the lateral direction in the case of frontal collision) and which is determined from the lateral acceleration Gy in the case of frontal collision. In this example, the first parameter is longitudinal acceleration Gx and the second parameter is lateral acceleration Gy in the case of frontal collision. In the case of side collision, the first parameter is lateral acceleration Gy and the second parameter is longitudinal acceleration Gx.

Delay time Td1 is so determined that delay time Td1 increases as the acceleration in the first direction (which is the longitudinal direction in the case of frontal collision) becomes higher, and delay time Td1 decreases as the acceleration in the second direction (which is the lateral direction in the case of frontal collision) increases.

In the case of frontal collision, delay time Td1 can be given by the following equation EQ1.

$$Td1(t)=f(Gx(t))*Gx(t)/Gy(t) \quad (EQ1)$$

Figure 7A:
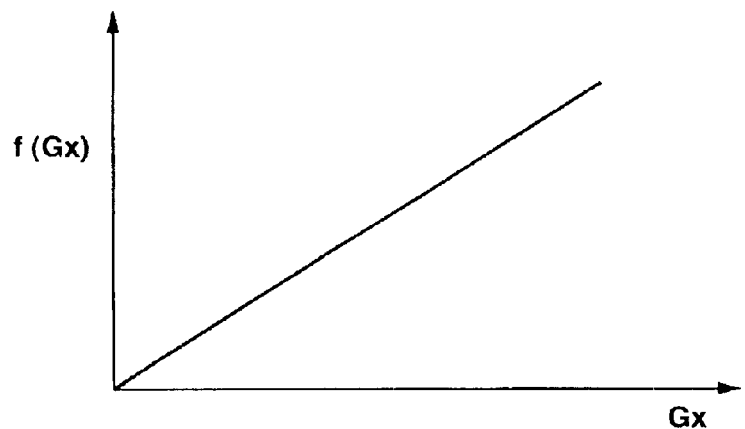
FIGS. 7A and 7B are graphs showing two different forms of a function of a first parameter which can be used in the first embodiment.
Figure 7B:
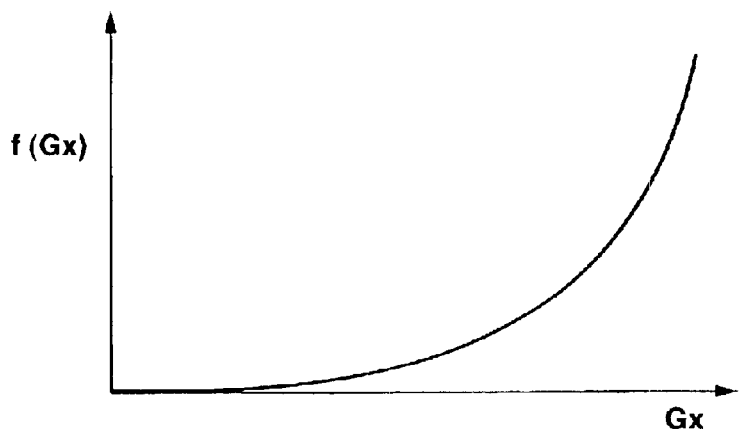

In this equation, asterisk is used as a multiplication sign, and f(Gx(t)) is an increasing function (or monotone nondecreasing function) of longitudinal acceleration Gx(t). In an example shown in FIG. 7A, the increasing function f(Gx(t)) is linear. In another example shown in FIG. 7B, the function f(Gx(t)) increases in a geometric progression with increase in longitudinal acceleration Gx. In the example of FIG. 7B, the increasing function of the first parameter (Gx) is a nonlinear function which is increased so that the rate of increase of the delay time with respect to the first parameter is increased as the first parameter increases. In the example of equation EQ1, delay time Td1 is proportional to the quantity resulting form multiplication of f(Gx(t)) and Gx(t), and inversely proportional to Gy(t).

Instead of equation EQ1, it is optional to calculate delay time Td1 by using the following equation EQ2.

$$Td1(t)=f(Gy(t))*Gx(t) \quad (EQ2)$$

Figure 8A:
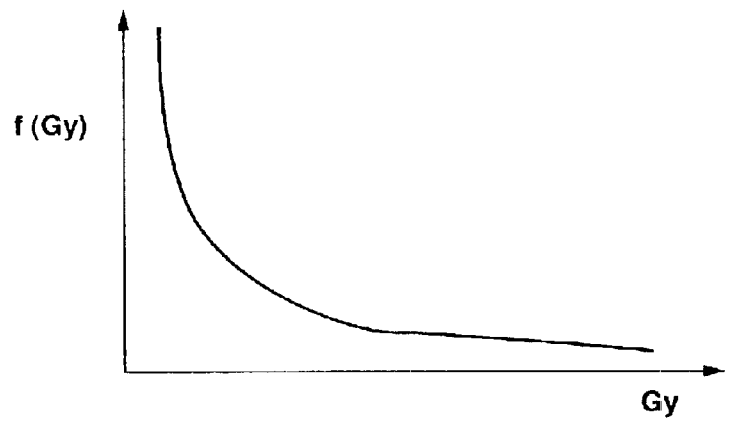
FIGS. 8A and 8B are graphs showing two different forms of a function of a second parameter which can be used in the first embodiment.
Figure 8B:
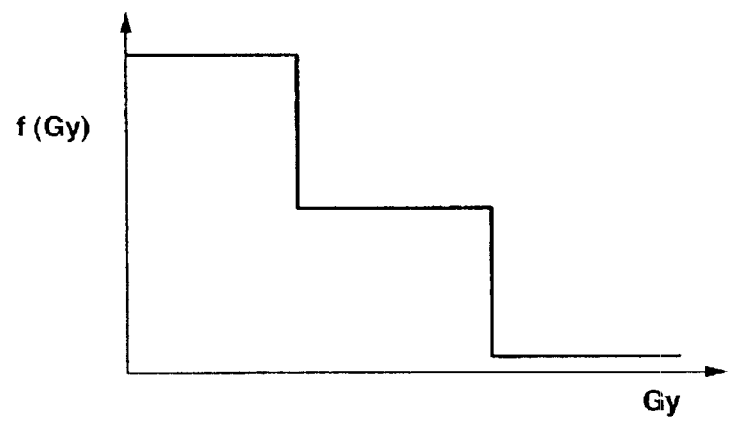

In this equation, f(Gy(t)) is a decreasing function (or monotone nonincreasing function) which decreases (or remains unincreased) monotonically with increase in the second parameter which in this case is the lateral acceleration Gy(t). In an example shown in FIG. 8A, the decreasing function f(Gy(t)) is defined as a function inversely proportional to a geometric progression of lateral acceleration Gy. In this example of FIG. 8A, the decreasing function of the second parameter (Gy) is decreased as the second parameter increases in such a nonlinear manner that the rate of decrease of the function with respect to the second parameter decreases as the second parameter increases. In another example shown in FIG. 8B, the decreasing function of the second parameter (Gy) decreases stepwise in the form of a staircase. In the case of the second equation EQ2, delay time Td is equal to a product resulting from multiplication of the quantity which is the decreasing function f(Gy(t)) of the second parameter, by the first parameter which is the longitudinal acceleration Gx(t).

Figures 14, 15A, 15B:
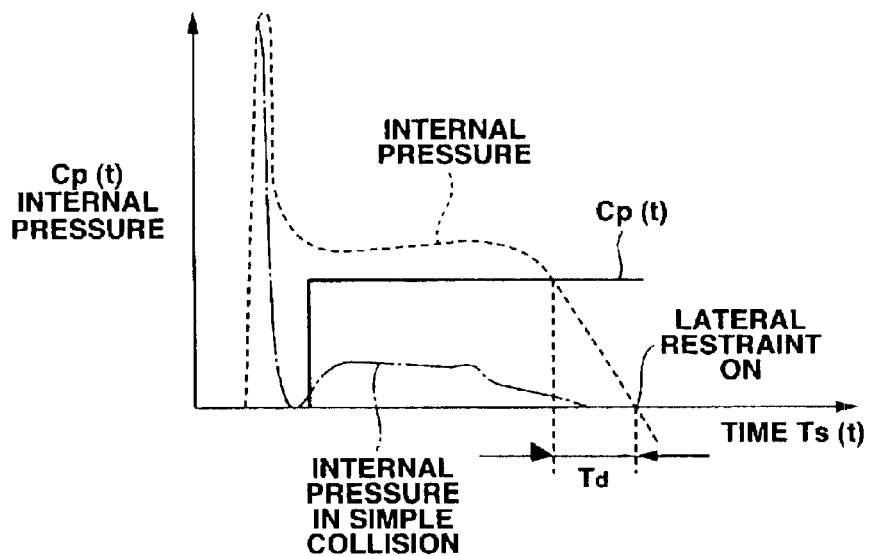
FIG. 14 is a graph for illustrating a threshold of a front air bag internal pressure used in the third embodiment.
FIGS. 15A and 15B are tables for determining the delay time from the longitudinal and lateral accelerations in frontal collision and side collision, respectively, which can be used in the first embodiment of the present invention.

Alternatively, control unit 1 can determine delay time Td in accordance with longitudinal acceleration Gx and lateral acceleration Gy by table lookup as shown in FIGS. 15A and 15B. FIG. 15A shows an example for determining Td1 in the case of frontal collision, and FIG. 15B shows an example for determining Td2 in the case of side collision. Control unit 1 obtains a value of the delay time in response to a pair of a value of Gx and a value of Gy.

In either case, the restraint system according to the first embodiment can trigger lateral restraint apparatus 11 in dependence of the condition of longitudinal acceleration even when lateral acceleration Gy is lower than the level of lateral acceleration actuating lateral restraint apparatus 11 in a simple side collision. Thus, after the trigger action of longitudinal restraint apparatus 10 upon frontal collision of the vehicle, this restraint system can trigger lateral restraint apparatus 11 at a lateral acceleration of about 10 G which could not trigger lateral restraint in earlier technology.

At step S33, control unit 1 sets time T(t) to trigger lateral restraint apparatus 11 by addition of the thus-calculated delay time Td(G) and the current time that is the elapsed time Ts(t) from the occurrence of the collision (T(t)=Ts(t)+Td(G)). Then, control unit 1 compares the current set time T(t) determined in this execution cycle, with the previous set time T(t−Δt) determined in the previous cycle at the time of t−Δt, and sets the time T(t) equal to the smaller of the current time T(t) and the previous T(t−Δt) at step S35 or S36.

At step S37, control unit 1 compares the set time T(t) determined st step S35 or S36, with the elapsed time Ts(t) representing the current point in time. When set time T(t) is greater than or equal to elapsed time Ts(t), control unit 1 returns to step S31 and repeats step S31 and the subsequent steps. When set time T(t) is smaller than elapsed time Ts(t) (T(t)<Ts(t)), then control unit 1 produces a trigger to actuate lateral restraint apparatus 11 at step S38 which corresponds to step S9. In response to this trigger, this restraint system triggers side collision air bag 5 and buckle pretensioner 6 of lateral restraint apparatus 11.

In the case of side collision, control unit 1 proceeds from step S3 to step S10, and actuates side collision air bag 5 and buckle pretensioner 6 of lateral (first) restraint apparatus 10, at step S10. Then, control unit 1 performs operations to estimate the amount of movement of the occupant in the lateral direction and the amount of movement of the occupant in the longitudinal direction at step S11, and determines whether to further actuates longitudinal (second) restraint apparatus 10, at step S12, by using the estimated amount of the longitudinal movement and the estimated amount of the lateral movement, substantially in the same manner as in step S6. In the case of side collision, the delay time Td2 for the actuation of longitudinal (second) restraint apparatus 10 after the actuation of lateral (first) restraint apparatus 11 is defined so that delay time Td2 decreases as longitudinal acceleration Gx increases, and delay time Td2 increases as lateral acceleration Gy increases. Delay time Td2 for side collision is given by the following equation EQ3 instead of equation EQ1 for frontal collision.

$$Td2(t)=f(Gy(t))*Gy(t)/Gx(t) \quad (EQ3)$$

In this equation, f(Gy(t)) is an increasing (or monotone nondecreasing) function of lateral acceleration Gy(t). Increasing function f(Gy(t)) is a function which decreases with increase in lateral acceleration Gy(t). Increasing function f(Gy(t)) may be linear (in the same manner as in FIG. 7A). Alternatively, function f(Gy(t)) may increase in a geometric progression with increase in lateral acceleration Gy (in the same manner as in FIG. 7B). In this case, the increasing function of the first parameter (Gy) may be a nonlinear function which is increased so that the rate of increase of the delay time with respect to the first parameter (Gy) is increased as the first parameter increases.

Instead of the equation EQ3, it is optional to calculate delay time Td2 by using the following equation EQ4.

$$Td2(t)=f(Gx(t))*Gy(t) \qquad (EQ4)$$

In this equation, f(Gx(t)) is a decreasing funrcton (or monotone nonincreasing function) which decreases monotonically with increase in the second parameter which in this case is the longitudinal acceleration Gx(t). Decreasing function f(Gy(t)) may be defined as a function inversely proportional to a geometric progression of longitudinal acceleration Gx in the same manner as in FIG. 8A. In this case, the decreasing function of the second parameter (Gx) is decreased as the second parameter increases in such a nonlinear manner that the rate of decrease of the function with respect to the second parameter decreases as the second parameter (Gx) increases. In another example, the decreasing function of the second parameter (Gx) is decreased stepwise in the form of a staircase in the same manner as in FIG. 8B. In the case of equation EQ4, delay time Td2 is equal to a product resulting from multiplication of the quantity which is the decreasing function f(Gx(t)) of the second parameter, by the first parameter which is the lateral acceleration Gy(t).

In this way, the restraint system according to the first embodiment is set to trigger longitudinal restraint apparatus 10 upon side collision in dependence of the condition of lateral acceleration even when longitudinal acceleration Gx is lower than the limit of longitudinal acceleration required to trigger longitudinal restraint apparatus 10. Thus, after the trigger action of lateral restraint apparatus 11 upon side collision of the vehicle, this restraint system can trigger longitudinal restraint apparatus 10 at a longitudinal acceleration of about 10 G which could not trigger longitudinal restraint in earlier technology. This restraint system thus triggers air bag 4 for frontal collision and seat belt pretensioner 5 adequately at step S15.

The vehicle occupant restraint system according to the first embodiment estimates the amount of movement of the occupant in accordance with the longitudinal acceleration and lateral acceleration acting on the vehicle body after the actuation of the first restraint apparatus and decides on the need for actuating the second restraint apparatus after the actuation of the first restraint apparatus in accordance with the estimated amount of the occupant movement. Therefore, this restraint system can restrain the occupant securely and timely even in a situation, such as a collision in an oblique direction, where the system tends to trigger the restraint only in one of the longitudinal and lateral directions, and tends to incur undesired lag in the trigger.

Figure 10:
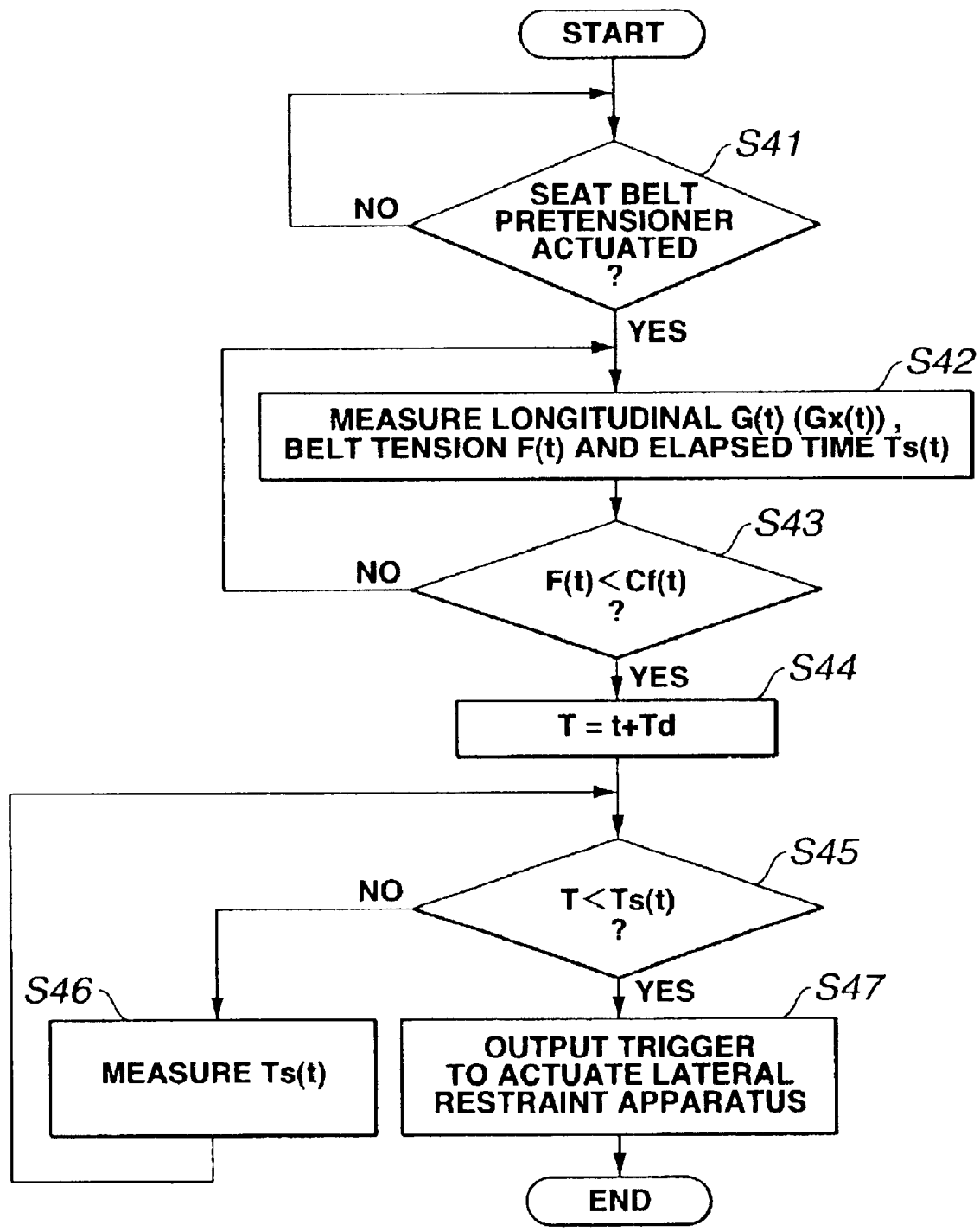
FIG. 10 is a flowchart according to the second embodiment, for determining the delay time.

FIG. 10 shows a control procedure according to a second embodiment of the present invention. The example shown in FIG. 10 is designed to treat frontal collisions.

In a vehicle occupant restraint system according to the second embodiment, there are further provided a seat belt tension sensor (or belt tension meter) 8, a seat surface pressure sensor 110 and a seat position sensor 111. Seat belt tension sensor 8 is arranged to measure a seat belt tension after a collision, and to supply data on the seat belt tension to control unit 1.

Figure 9:
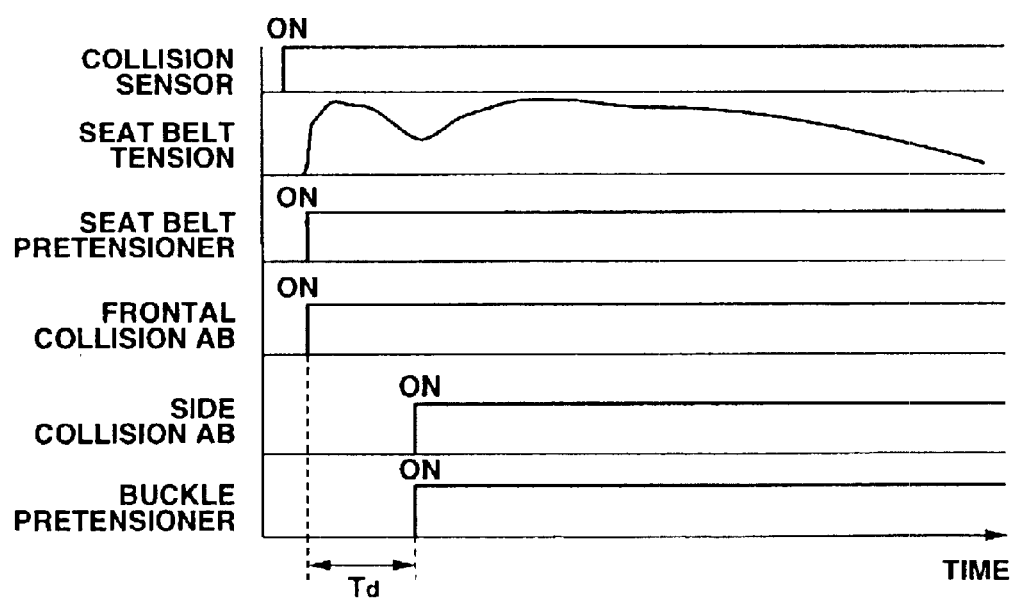
FIG. 9 is a time chart illustrating operations of a vehicle occupant restraint system according to a second embodiment of the present invention.
Figure 11:
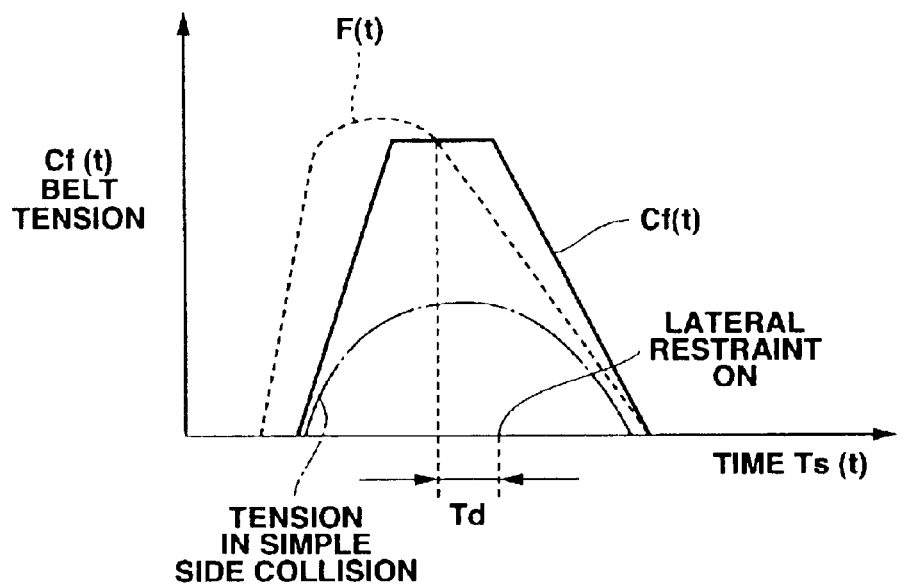
FIG. 11 is a graph for illustrating a threshold of a seat belt tension used in the second embodiment.

The control flow is substantially the same as the flow of the first embodiment. However, in steps S6 and S7, the seat belt tension is used as the parameter representing the amount of movement of the occupant in the second (lateral) direction, as shown in FIGS. 9, 10 and 11. FIG. 9 is a time chart illustrating operations of the restraint system according to the second embodiment, FIG. 10 is flowchart showing the main portion of the control flow according to the second embodiment, and FIG. 11 is a graph showing the seat belt tension F(t) and a belt tension threshold Cf(t) used in the second embodiment.

After confirmation of the actuation of seat belt pretensioner 3 at step S41, control unit 1 measures seat belt tension F(t), and elapsed time Ts(t) after the actuation of longitudinal restraint apparatus 10, at step S42. At next step S43, control unit 1 compares seat belt tension F(t) with a preset belt tension threshold Cf(t).

In this example, belt tension threshold Cf(t) is determined in accordance with longitudinal acceleration Gx, the body (or build) of the occupant (driver or passenger), the seat position, and the posture of the occupant in the following manner.

$$Cf(t)=Gx(t)/30 \times Cf0(t0) \times m/75$$

$$t0=t+S1(d)+S2(a)$$

In these equations, Cf0(t) is a standard threshold, t is time, m is the weight of the occupant, t0 is a correction time, S1(d) is a seat position correction coefficient, d is the seat position, S2(a) is an occupant posture correction coefficient, and a is a seat back angle. Seat position correction coefficient S1(d) is equal to zero when the seat position is at the middle of the range of seat movement. On the front side of the middle of the range, seat position correction coefficient S1(d) is negative, and becomes smaller as the seat position moves toward the front of the vehicle. On the rear side of the middle of the range, seat position correction coefficient S1(d) is positive, and becomes greater as the seat position moves toward the rear of the vehicle. In this example, the seat back angle is measured and used as a parameter representing the occupant posture, and the posture correction coefficient S2(a) is determined in accordance with the seat back angle. Posture correction coefficient S2(a) is zero when the seat back angle is 20°. When the seat back angle is smaller than 20°, posture correction coefficient S2(a) is negative and becomes smaller with decrease in the seat back angle (adjustment toward the front). When the seat back angle is greater than 20°, posture correction coefficient S2(a) is positive and becomes greater with increase in the seat back angle.

Seat belt tension F(t) sensed by tension sensor 8 is used as a parameter representing the amount of occupant movement in the lateral (left and right) direction. Therefore, the amount of movement of the occupant in the lateral direction can be calculated from the seat belt tension and duration. The amount of occupant movement in the lateral direction is smaller when the peak value of the seat belt tension F(t) is greater, and when the duration of the belt tension is longer. As shown in FIG. 11, the need for actuating lateral restraint apparatus 11 is affirmed even in the range in which the belt tension is greater than the belt tension produced in a simple lateral collision as shown by a one-dot chain line, and the duration is longer, that is when the amount of the movement in the lateral direction is smaller than the amount of lateral occupant movement resulting from a simple lateral collision.

Steps S42 and S43 are repeated until the sensed belt tension F(t) becomes smaller than belt tension threshold Cf(t). When belt tension F(t) is smaller than threshold Cf(t), then control unit 1 proceeds from step S43 to step S44 and determines a set time T by addition of the current time that is the elapsed time Ts(t) from the occurrence of the collision, and a predetermined delay time (Td). In this example, the predetermined delay time Td is a constant or a fixed time interval.

At step S45, control unit 1 compares elapsed time Ts(t) with set time T determined at step S44. When set time T is greater than elapsed time Ts(t), then control unit 1 measures the current time or elapsed time Ts(t) at step S46, and repeats step S45. When set time T is smaller than elapsed time Ts(t), control unit 1 produces a trigger to actuate lateral restraint apparatus 11 at step S47. In response to the trigger, side air bag 5 and buckle pretensioner 6 of lateral restraint apparatus 11 are actuated.

In this way, the restraint system according to the second embodiment can estimate the amount of occupant movement in the lateral direction and the start of the movement of the occupant accurately by using the actual seat belt tension sensed by belt tension sensor 8, as the parameter representing the amount of occupant movement in the lateral direction, and thereby this restraint system triggers lateral restraint apparatus 11 properly and timely.

Figure 13:
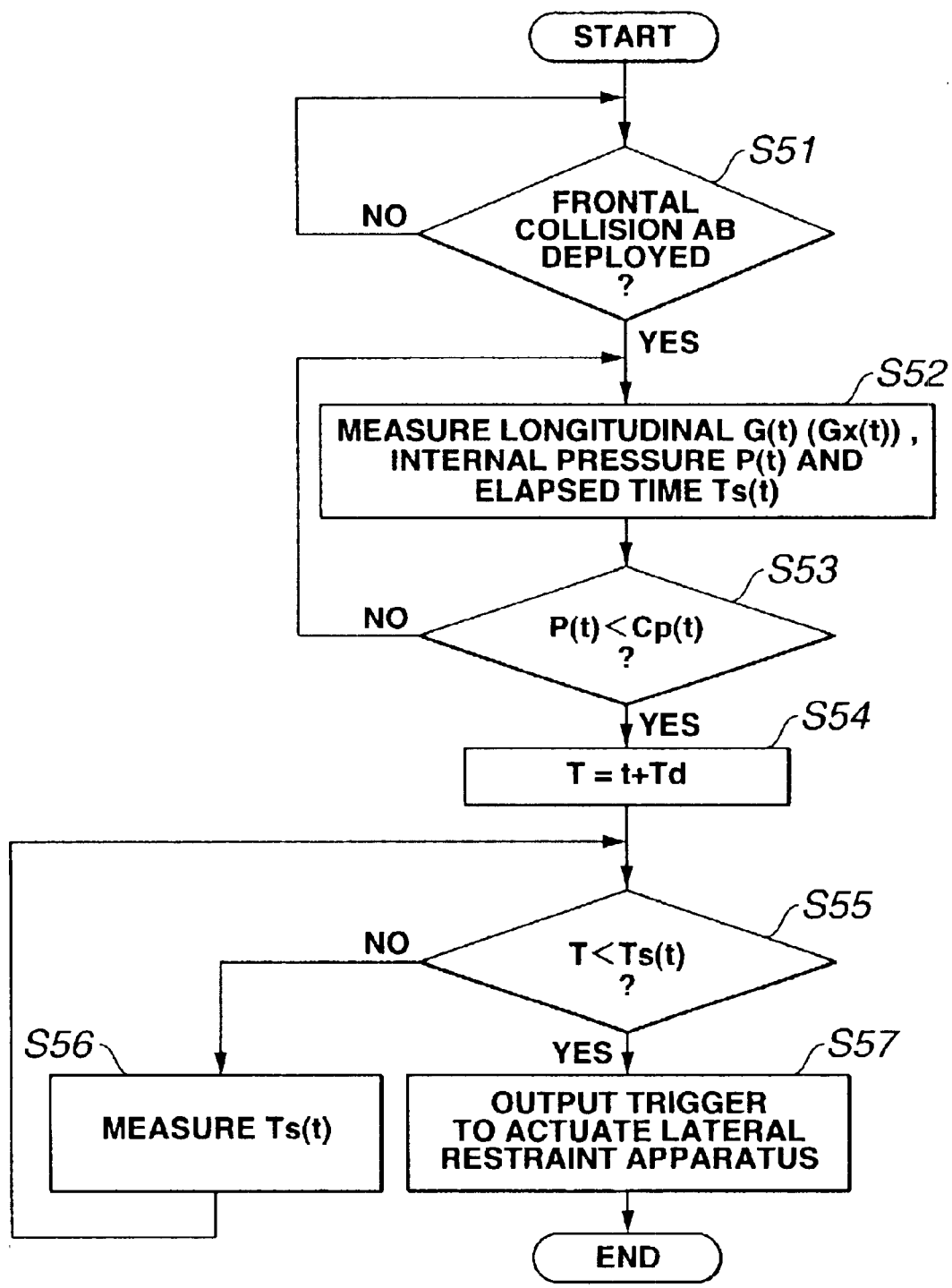
FIG. 13 is a flowchart according to the third embodiment, for determining the delay time.

FIG. 13 shows a control procedure according to a third embodiment of the present invention. The example shown in FIG. 13 is arranged to treat frontal collisions.

In a vehicle occupant restraint system according to the third embodiment, there are further provided a front air bag internal pressure sensor 9, seat surface pressure sensor 110 and seat position sensor 111. Front air bag internal pressure sensor 9 is arranged to measure an internal pressure in front collision air bag 4 after a collision, and supply data on the internal pressure to control unit 1.

Figure 12:
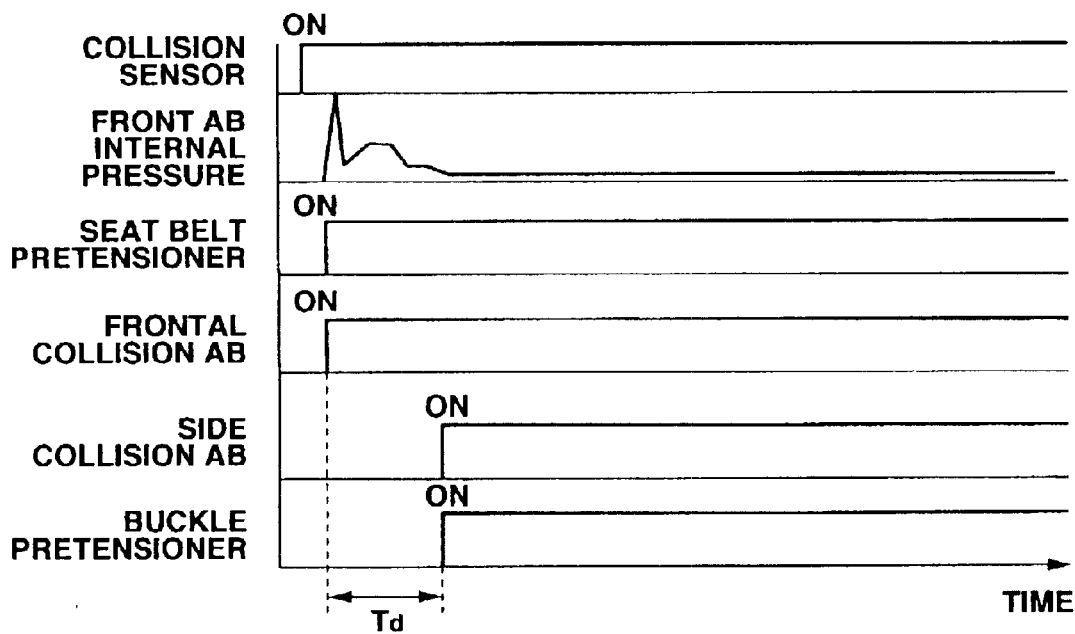
FIG. 12 is a time chart illustrating operations of a vehicle occupant restraint system according to a third embodiment of the present invention.

The control flow is substantially the same as the flow of the first embodiment. However, in steps S6 and S7, the internal pressure in front air bag 4 is used as the parameter representing the amount of movement of the occupant in the second (lateral) direction, as shown in FIGS. 12, 13 and 14. FIG. 12 is a time chart illustrating operations of the restraint system according to the third embodiment, FIG. 13 is a flowchart showing the main portion of the control flow according to the third embodiment, and FIG. 14 is a graph showing the front air bag internal pressure P(t) and a pressure threshold Cp(t) used in the third embodiment.

After confirmation of the actuation of front air bag 4 at step S51, control unit 1 measures front air bag internal pressure P(t), and elapsed time Ts(t) after the actuation of longitudinal restraint apparatus 10, at step S52. At next step S53, control unit 1 compares front air bag internal pressure P(t) with a preset internal pressure threshold Cp(t).

In this example, internal pressure threshold Cp(t) is determined in accordance with longitudinal acceleration Gx, the body (or build) of the occupant, the seat position, and the posture of the occupant in the same manner as in the second embodiment.

$$Cp(t)=Gx(t)/30 \times Cp0(t0) \times m/75$$

$$t0=t+S1(d)+S2(a)$$

In these equations, Cp0(t) is a standard threshold, t is time, m is the weight of the occupant, t0 is a correction time, S1(d) is a seat position correction coefficient, d is the seat position, S2(a) is an occupant posture correction coefficient, and a is a seat back angle as in the second embodiment.

Front air bag internal pressure P(t) sensed by pressure sensor 9 is used as a parameter representing the amount of occupant movement in the lateral (left and right) direction. The amount of occupant movement in the lateral direction is smaller when the peak value of the front air bag internal pressure P(t) is greater, and when the duration of the belt tension is longer. As shown in FIG. 14, the need for actuating lateral restraint apparatus 11 is affirmed in the range in which the front air bag internal pressure is greater than the front air bag internal pressure produced in a simple lateral collision as shown by a one-dot chain line, and the duration is longer, that is when the amount of the movement in the lateral direction is smaller than the amount of lateral occupant movement resulting form a simple lateral collision.

Steps S52 and S53 are repeated until the sensed air bag internal pressure P(t) becomes smaller than pressure threshold Cp(t). When front air bag internal pressure P(t) is smaller than threshold Cp(t), then control unit 1 proceeds from step S53 to step S54 and determines a set time T by addition of the current time that is the elapsed time Ts(t) from the occurrence of the collision, and a predetermined delay time Td. In this example, the predetermined delay time Td is a constant or a fixed time interval.

At step S55, control unit 1 compares elapsed time Ts(t) with set time T determined at step S54. When set time T is greater than elapsed time Ts(t), then control unit 1 measures the current time or elapsed time Ts(t) at step S56, and repeats step S55. When set time T is smaller than elapsed time Ts(t), control unit 1 produces a trigger to actuate lateral restraint apparatus 11 at step S57. In response to the trigger, side air bag 5 and buckle pretensioner 6 of lateral restraint apparatus 11 are actuated.

In this way, the restraint system according to the third embodiment can estimate the amount of occupant movement in the lateral direction and the start of the movement of the occupant accurately by using the actual front air bag internal pressure sensed by pressure sensor 9, as the parameter representing the amount of occupant movement in the lateral direction, and thereby this restraint system triggers lateral restraint apparatus 11 properly and timely.

The restraint system can check the second parameter representing the amount of movement of the occupant in the second direction, and determine (at step S6 or S12) whether or not to trigger the second restraint apparatus.

At least one of steps S1, S2 and S3 can correspond to means for monitoring a first operating condition to detect a collision of the vehicle tending to push the occupant in a first direction. At least one of steps S4 and S10 can correspond to means for producing a first trigger signal upon detection of the collision to restrain the vehicle occupant in the first direction. At least one of steps S5, S6, S11 and S12 can correspond to means for examining a second operating condition) to estimate movement of the occupant resulting from the collision. At least one of steps S7, S13, S32, S33, S44 and S54 can correspond to means for delaying a second trigger signal to restrain the vehicle occupant in a second direction with respect to the first trigger signal.

This application is based on a prior Japanese Patent Application No. 2001-159327 filed in Japan on May 28, 2001. The entire contents of this Japanese Patent Application No. 2001-159327 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle occupant restraint system comprising:
a first restraint apparatus to restrain an occupant in a vehicle in a first direction of the vehicle;
a second restraint apparatus to restrain the occupant in a second direction of the vehicle, the first direction being one of a longitudinal direction and a lateral direction of the vehicle, the second direction being the other of the longitudinal direction and lateral direction;
a sensing section to sense a first operating condition to detect a collision of the vehicle tending to push the occupant in the first direction, and a second operating condition indicative of movement of the occupant resulting from the collision; and
a controller configured
to trigger the first restraint apparatus on the occurrence of the collision tending to push the occupant in the first direction,
to set a delay time in accordance with the second condition, and
to trigger the second restraint apparatus at an instant delayed by the delay time with respect to a first trigger action of triggering the first restraint apparatus.

2. The vehicle occupant restraint system as claimed in claim 1, wherein the controller is configured to set the delay time so that the delay time decreases as an amount of movement of the occupant in the second direction increases.

3. The vehicle occupant restraint system as claimed in claim 2, wherein the controller is configured to set the delay time so that the delay time increases as an amount of the movement of the occupant in the first direction increases.

4. The vehicle occupant restraint system as claimed in claim 2, wherein the sensing section senses the second operating condition after the first trigger action of triggering the first restraint apparatus, and the controller determines the delay time after the first trigger action of triggering the first restraint apparatus; and wherein the second operating condition is the condition for predicting the movement of the occupant in the second direction, and the second operating condition is one of a vehicle acceleration in the second direction and a condition of the first restraint apparatus.

5. The vehicle occupant restraint system as claimed in claim 1, the controller determines the delay time so that the delay time is increased monotonically with increase in a first parameter representing an amount of the movement of the occupant in the first direction, and the delay time is decreased monotonically with increase in a second parameter representing the amount of the movement of the occupant in the second direction.

6. The vehicle occupant restraint system as claimed in claim 5, wherein the delay time is proportional to a quantity including, as a factor, an increasing function of the first parameter; and wherein the delay time is inversely proportional to the second parameter representing the amount of the movement of the occupant in the second direction.

7. The vehicle occupant restraint system as claimed in claim 6, wherein the increasing function of the first parameter is linear to the first parameter.

8. The vehicle occupant restraint system as claimed in claim 6, wherein the increasing function of the first parameter is a function which is increased in a geometric progression as the first parameter increases.

9. The vehicle occupant restraint system as claimed in claim 5, wherein the delay time is proportional to a decreasing function of the second parameter and the delay time is proportional to the first parameter.

10. The vehicle occupant restraint system as claimed in claim 9, wherein the decreasing function of the second parameter is such a function that the function increases in a geometric progression as the second parameter decreases.

11. The vehicle occupant restraint system as claimed in claim 9, wherein the decreasing function of the second parameter is a function decreasing stepwise as the second parameter increases.

12. The vehicle occupant restraint system as claimed in claim 5, wherein the controller determines the delay time in accordance with the first and second parameters by table lookup.

13. The vehicle occupant restraint system as claimed in claim 5, wherein the sensing section comprises a first acceleration sensor to sense a vehicle acceleration in the first direction and a second acceleration sensor to sense a vehicle acceleration in the second direction; and wherein the first parameter representing an amount of movement of the occupant in the first direction is determined by the vehicle acceleration in the first direction and the second parameter representing the amount of movement of the occupant in the second direction is determined by the vehicle acceleration in the second direction.

14. The vehicle occupant restraint system as claimed in claim 2, wherein the controller produces a second restraint trigger request signal in accordance with the second operating condition indicative of the amount of movement of the occupant in the second direction, and triggers the second restraint apparatus at the end of a predetermined interval from the second restraint trigger request signal.

15. The vehicle occupant restraint system as claimed in claim 14, wherein the controller produces the second trigger request signal when the second operating condition becomes smaller than a threshold which is determined in accordance with a condition of the occupant, the second operating condition being a quantity which decreases when the amount of movement of the occupant in the second direction is smaller.

16. The vehicle occupant restraint system as claimed in claim 1, wherein the sensing section comprises a belt tension sensor to sense a belt tension of a seat belt and the second operating condition is the belt tension.

17. The vehicle occupant restraint system as claimed in claim 1, wherein the sensing section comprises a pressure sensor to sense an internal pressure of an air bag and the second operating condition is the internal pressure.

18. The vehicle occupant restraint system as claimed in claim 1, wherein one of the first and second restraint apparatus comprises a seat belt pretensioner and an air bag for frontal collision, and the other of the first and second restraint apparatus comprises a buckle pretensioner and an air bag for side collision.

19. A vehicle occupant restraining method for restraining a vehicle occupant in a vehicle, the vehicle occupant restraining method comprising:
sensing a first operating condition to detect a collision of the vehicle tending to push the occupant in a first direction which is one of longitudinal direction and lateral direction of the vehicle;
performing a first trigger action to restrain the vehicle occupant in the first direction;
sensing a second operating condition indicative of movement of the occupant resulting from the collision;
setting a delay time in accordance with the second condition; and restraining the occupant in a second direction which is the other of the longitudinal direction and lateral direction, at an instant delayed by the delay time with respect to the first trigger action.

20. A control apparatus for a vehicle occupant restraint system, comprising:
   means for monitoring a first operating condition to detect a collision of the vehicle tending to push the occupant in a first direction which is one of longitudinal direction and lateral direction of the vehicle;
   means for producing a first trigger signal upon detection of the collision to restrain the vehicle occupant in the first direction;
   means for examining a second operating condition to estimate movement of the occupant resulting from the collision; and
   means for delaying a second trigger signal to restrain the vehicle occupant in a second direction which is the other of the longitudinal direction and lateral direction, with respect to the first trigger signal, by a delay time determined in accordance with the second operating condition so that the delay time is increased when an amount of movement of the occupant in the second direction is greater.

21. A vehicle occupant restraint system comprising:
   a longitudinal restraint apparatus to restrain an occupant in a vehicle in a longitudinal direction of the vehicle;
   a lateral restraint apparatus to restrain the occupant in a lateral direction of the vehicle;
   a collision sensor to sense a collision of the vehicle;
   a movement estimating section to estimate a longitudinal movement quantity of the occupant and a lateral movement quantity of the occupant; and
   a timing control section to control timings of actuation of the first restraint apparatus and the second restraint apparatus in response to a signal from the collision sensor,
   the timing control section being configured to set a delay time in accordance with the longitudinal movement quantity and the lateral movement quantity,
   the delay time being an amount of time by which the timing of actuation of one of the longitudinal and lateral restraint apparatuses is retarded with respect to the timing of actuation of the other of the longitudinal and lateral restraint apparatuses,
   the delay time being so set that the delay time is proportional to one of the longitudinal movement quantity and the lateral movement quantity.

22. The vehicle occupant restraint system as claimed in claim 21, wherein the delay time is so set that the delay time is proportional to one of the longitudinal movement quantity and the lateral movement quantity, and inversely proportional to the other of the longitudinal movement quantity and the lateral movement quantity.

23. The vehicle occupant restraint system as claimed in claim 21, wherein the movement estimating section is configured to estimate the longitudinal movement quantity of the occupant from a longitudinal acceleration of the vehicle, and the lateral movement quantity of the occupant from a lateral acceleration of the vehicle.

24. The vehicle occupant restraint system as claimed in claim 21, wherein the movement estimating section is configured to estimate the longitudinal movement quantity and the lateral movement quantity of the occupant from a seat belt tension of a seat belt.

25. The vehicle occupant restraint system as claimed in claim 21, wherein the movement estimating section is configured to estimate the longitudinal movement quantity and the lateral movement quantity of the occupant from an internal pressure of an air bag.

* * * * *